(12) United States Patent
Stocker

(10) Patent No.: US 7,131,600 B2
(45) Date of Patent: Nov. 7, 2006

(54) REVERSE VENTURI ATOMIZATION CHAMBER AND THE USE THEREOF

(76) Inventor: Russell Stocker, P.O. Box 4817, Davis, CA (US) 95616

( * ) Notice: Subject to any disclaimer, the term of this patent is extended or adjusted under 35 U.S.C. 154(b) by 510 days.

(21) Appl. No.: 10/730,314

(22) Filed: Dec. 4, 2003

(65) Prior Publication Data
US 2005/0121538 A1    Jun. 9, 2005

(51) Int. Cl.
*B64D 1/18* (2006.01)
(52) U.S. Cl. .................. 239/171; 239/77; 239/424; 239/426; 239/433; 239/543; 239/545; 239/592; 239/594; 239/597; 239/598; 244/136
(58) Field of Classification Search .............. 239/77, 239/171, 423, 424, 426, 433, 434, 543, 545, 239/589, 592, 593, 594, 597, 598; 244/136; 169/53
See application file for complete search history.

(56) References Cited

U.S. PATENT DOCUMENTS

| | | | | |
|---|---|---|---|---|
| 1,749,504 A | * | 3/1930 | Pelton | 239/171 |
| 1,957,075 A | * | 5/1934 | Morgensen, Jr. | 244/136 |
| 2,048,847 A | * | 7/1936 | Desmet | 244/136 |
| 2,395,827 A | * | 3/1946 | Husman | 244/136 |
| 2,562,524 A | * | 7/1951 | Burnum | 244/136 |
| 2,836,463 A | * | 5/1958 | Wilson | 239/171 |
| 3,429,507 A | * | 2/1969 | Jones | 239/171 |
| 3,476,337 A | * | 11/1969 | Cornett, Jr. | 244/136 |
| 3,521,125 A | * | 7/1970 | Nelson | 239/704 |
| 4,260,108 A | * | 4/1981 | Maedgen, Jr. | 239/171 |
| 4,328,940 A | * | 5/1982 | Malcolm | 244/136 |
| 4,412,654 A | * | 11/1983 | Yates et al. | 239/171 |

\* cited by examiner

*Primary Examiner*—Steven J. Ganey
(74) *Attorney, Agent, or Firm*—Mark C. Jacobs

(57) ABSTRACT

An atomization chamber apparatus used for aircraft pesticide delivery, which has an open ended walled chamber, divided into left and right sections, each having outer and inner segments, each segment having a top and a bottom wall, the outer segments having a same radius concave upper wall and a convex lower wall, while the inner segments have a same radius convex radius upper wall and a concave lower wall. A nozzle injector connectable to a fluid pesticide source is laterally disposed in an inner segment. The nozzle is chosen such that exiting pesticide will not impact the chamber walls, and the radii of the segments are chosen such that the speed of pesticide atomization by the incoming air is slowed down to reduce fines upon pesticide impact, and the speed of the pesticide air mixture on exiting the chamber is increased to substantially match the airspeed of the aircraft.

21 Claims, 8 Drawing Sheets

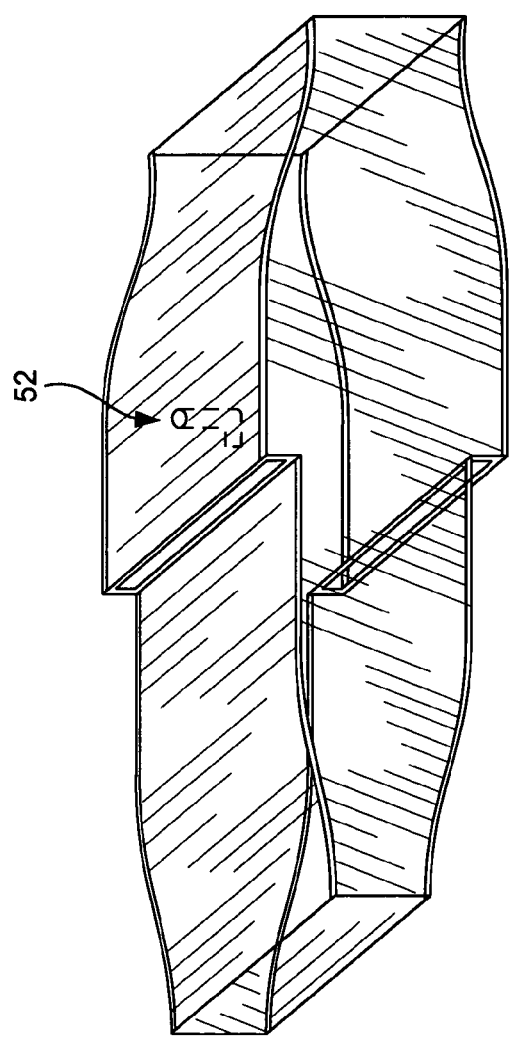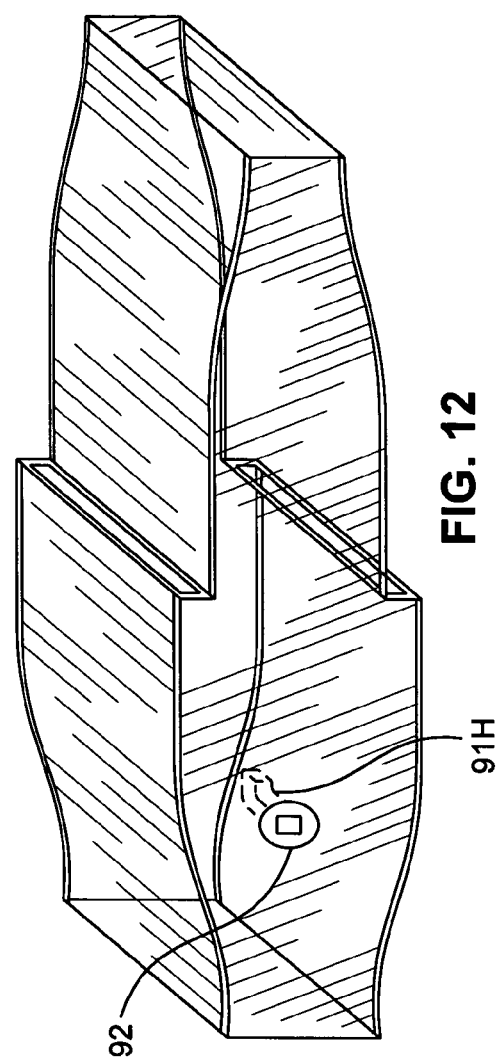
FIG. 11
FIG. 12

REVERSE VENTURI ATOMIZATION CHAMBER AND THE USE THEREOF

FIELD OF THE INVENTION

This application pertains to aerial spraying of crops and to the aerial destruction of insects by use of pesticides delivered by a helicopter or fixed wind aircraft.

BACKGROUND OF THE INVENTION

Agricultural applicators are committed to the management of chemical drift and take responsibility on a daily basis for making good decisions in the field.

Aerial services provided by fixed-wing aircraft and helicopters are used to fight forest or grassland fires, feed fish, melt snow and control pests that threaten human health in addition to agricultural functions such as seeding crops or the application of pesticides (herbicides, insecticides, rodenticides, fungicides, bactericide, germicide, microbicide, larvicide, defoliants, and fertilizers to food and fiber crops. In United States agriculture, about one half of the crop production materials applied are delivered to the target by air. Aircrafts can cover large areas very quickly without disturbing either the soil or crops. Aircrafts also can operate when fields are too wet for ground application methods. This is important because some pests and/or diseases can do serious damage in just a few days and also because ground application methods can contribute to soil compaction and/or physically damage the crop.

A 1994 survey by the National Agricultural Aviation Association found that there are approximately 2500 agricultural pilot/operators in the United States who fly approximately 3,000 aircrafts. Each of these aircrafts treated an average of ~50,000 acres per year, representing a total of roughly 1.5 million acres. Most of the operators who returned the survey expected to expand their enterprises either with larger capacity aircraft or by increasing the hours each aircraft would be operated. All of the operators responding applied liquid materials, with herbicides representing 78% and fertilizers the remaining 22% of the materials applied. Nationwide, over 70% of these operators applied dry materials.

Material that drifts offsite is material that is not applied to the target crop or pest and represents wasted time and wasted material as well as wasted fuel. The drifting offsite results in increased costs for both the farmer and applicator and subsequently to the public and consumer. Materials such as herbicides and defoliants, for example that drift offsite can be a serious financial liability, particularly if surrounding crops suffer actual crop damage or off-label residues become present on the crop that should not have been sprayed. Environmental concerns for air and water quality protection and for animal habitat maintenance and endangered species protection make off-target spray drift an issue of high concern. Drift into/onto protected or particularly sensitive areas present a serious financial liability for the applicator, as well as an environmental issue.

Offsite spray drift is also a concern to the city dweller. As suburban populations spread into formerly rural and agricultural areas, buffer zones and/or no spray zones between populated and agricultural areas will increase in number and in total acreage. The imposition of buffer and no spray zones increases the difficulty for aerial applicators to do their job. The more complaints that are registered and more lawsuits filed, the more likely that additional regulations and/or restrictions on sprayers will be enacted, yet again affecting the cost of food.

The majority of agricultural materials are applied as a liquid solution from a nozzle-atomizer unit, also called a nozzle injector. The nozzle-atomizer must perform two functions. First, it must discharge the solution at a controlled and metered rate to provide appropriate coverage and accurate dosage for the material being applied and the crop/pest being treated/targeted. Second, the nozzle-atomizer must break the solution into appropriately sized drops for dispersal onto the target. Most nozzle-atomizers in use on agricultural sprayers produce a simultaneous range of drop sizes approximating a Gaussian or bell curve distribution range, which may be somewhat skewed towards smaller drops. It has not been determined that the production of a single-size drop would produce the most desirable coverage of plant surfaces, but it is widely understood that narrowed spectrum, which eliminates both the smallest and largest drops in the range, would be a desirable improvement in nozzle-atomizer [injector] design. By concentrating the drop size in a narrower range, the smallest, most drift-prone (fines) and the largest drops that produce poor coverage would be reduced significantly. Fines constitute that portion of the total spray that is likely to drift off and away from the intended target due to the smallness of the size of the drops of sprayed liquid.

Most nozzles utilize traditional designs, hydraulic pressure, fan, cone dispersion, solid stream, or rotary screen type design factors. These nozzles, when used on an aircraft, be it fixed wing or helicopter, release the spray solution into the airstream and utilize both the nozzle and air shear for atomization. Applicant, who has been in the field of aerial spraying for 30 years, has seen minimal advances in nozzle design with respect to the reduction of fines for spray drift control for aircraft over the last 15–20 years.

In most situations, aerial applicators have simply been using "off-the-shelf" nozzles, originally designed for ground applications and not specifically for aircrafts. Newer, more advanced nozzles are more convenient in actual use and can be changed more easily. Applicators have been creative in combining nozzles, nozzle orientation, spray pressure, and also have paid attention to environmental conditions, to obtain satisfactory application patterns to minimize offsite drift.

Ground application is slow and costly in man hours, particularly on large acreage, and is also very weather and condition dependent. Ground rigs simply cannot operate in fields when they are wet from either rain or irrigation.

Therefore to increase speed of application, aerial methods have been employed for many years. Early air applications were carried out by biplanes applying materials in dust form, DDT applicators became known as "crop dusters". Compared to ground-based spray methods, both fixed-wing aircraft and helicopters are much faster. Both helicopters and aircrafts are cost-effective in large-acreage or "narrow window" situations. Unfortunately, as air speed increases, so does the percentage of driftable fine droplets <200µ. Air shear "shatters" the droplets into "fines" and as air speed increases, so does turbulence, thus increasing the percentage of fines. Propeller turbulence (prop wash) in fixed-wing aircraft creates additional problems.

There is a need therefore to develop a method of dispensing agricultural materials in a dependable manner from a fixed-wing aircraft that will produce an appropriate size range of droplets, with a reduced percentage of fines <200µ, (driftable fines). The achieving of this goal will greatly reduce the potential for offsite spray drift.

There is also a need for an apparatus that be used to deliver various chemical agents to the target site which will minimize the formation of fines, that is drops of liquid that are smaller than 200 micron units.

These and other problems associated with on target confined delivery are addressed by this invention which employs a venturi chamber having two sections, a left section and a right section, each of which section is divided into two segments. The two segments of each section have mirror image upper and lower walls. The outer segment has a convex radius upper wall and a concave radius lower wall, while the inner segment has a convex radius upper wall and a concave radius lower wall. Each segment's upper and lower wall are substantially and same radius. The sidewalls of each section may be flat, or arcuate or other convenient shape, so long as uniform throughout the apparatus.

The invention accordingly comprises the device possessing the features, properties, the selection of components which are amplified in the following detailed disclosure, and the scope of the application of which will be indicated in the appended claims. For a fuller understanding of the nature and objects of the invention, reference should be made to the following detailed description, taken in conjunction with the accompanying drawings.

SUMMARY OF THE INVENTION

An atomization chamber having a reverse venturi therein to control the air speed and formation of droplets formed and being delivered is recited. The apparatus significantly reduces the percentage of fines by adjusting the incoming air velocity downward, such that atomization of incoming fluid pesticide by the impact of incoming air into the chamber, takes place in the presence of "low speed air" and the mixture of air and droplets formed is then accelerated out of the chamber at approximately the speed of the aircraft. These effects are achieved by the use of a double venturi (reverse venturi) atomization chamber.

It is a first object to provide an atomization chamber for mounting on an aircraft that will minimize the formation of fines.

It is a second object to provide an atomization chamber that will minimize formation of droplets under 200 microns yet permit the aircraft to maintain its normal speed range of 100 mph to 180 mph.

It is a third object to provide an atomization chamber wherein the fluid is injected at a 0-degree angle to the airflow.

It is a fourth object to provide a venturi-based atomization chamber for pesticide delivery by airplane that minimizes fine production.

It is a fifth object to provide a reverse venturi atomization chamber for herbicides.

These and other objects of the invention will in part be obvious and will in part appear hereinafter.

BRIEF DESCRIPTION OF FIGURES

FIG. 11 is a side perspective view of the third embodiment.

FIG. 12 is a view related to FIG. 4, but for the horizontal disposition of the nozzle injector.

DESCRIPTION OF THE PREFERRED EMBODIMENT

Introduction

Figure 1:
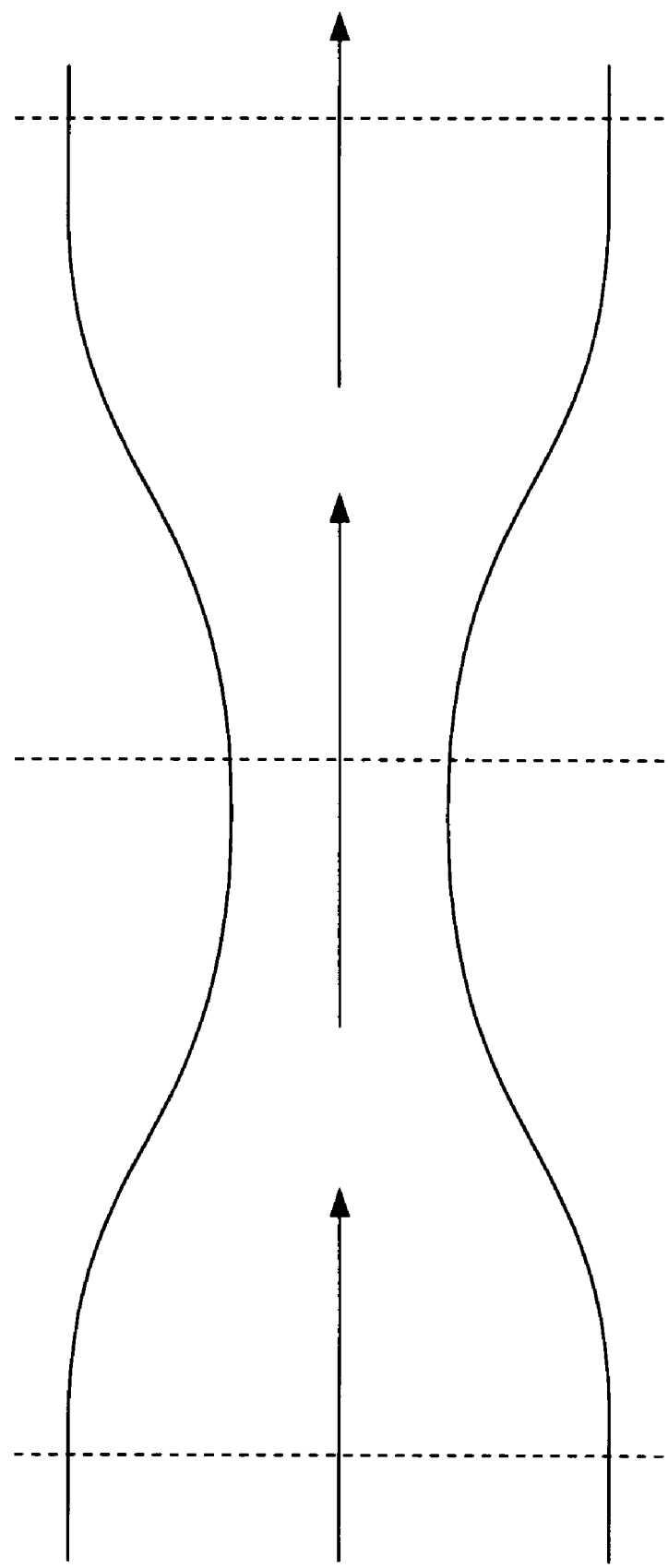
FIG. 1 is a side sectional elevational view of a prior art venturi atomizer.

Since this patent application pertains to the venturi effect and venturi tubes, a brief introduction is in order. When fluid is resting, the pressure exerted on the fluid is static at all locations on a horizontal plane. But when fluid is moving the situation changes. If the V or velocity of the fluid increases the pressure drops. This reduction with increasing pressure was first recognized by G. Venturi in the late $18^{th}$ century. A venturi tube is an apparatus that specifically causes a change in pressure as a fluid flows through it. Usually by conventional designs, the pressure drops. The conventional design of a venturi tube is a finite short length of straight pipe between two tapered sections of pipe. The intake end is one end and the other end is called the discharge end, which end is which depends on the direction of fluid flow. See FIG. 1.

At any point within the fluid there is a static pressure that is proportional to the height of the fluid. When the fluid flows there is created a dynamic pressure. The kinetic energy and the dynamic pressure are increased as the velocity of the moving fluid increases. As the dynamic pressure increases, the static pressure decreases—as the velocity increases. For incompressible fluids such as the liquid water, the calculations are easy. When a fluid such as a gas or air is involved, the calculations of the changes in pressure are more difficult as other factors have to be considered.

In 1974 researchers determined the critical air velocity, that is, the speed at which droplets break up, IE, shatter, and they determined the corresponding drop sizes at which this occurs. The results of these investigations and mph values have been set forth below:

| Critical Velocity | mph | Drop Size (microns µ) |
|---|---|---|
| 80.5 | 50 | 1500 |
| 105 | 65 | 900 |
| 137 | 85 | 535 |
| 161 | 100 | 385 |
| 241 | 210 | 170 |

At the speed of over 100 mph it is known that drops larger than 380 microns can be broken up into smaller droplets. Today, aircraft delivering herbicides and pesticides fly at speeds of about 120–150 mph this increases possibility of driftable fines formation during delivery periods.

The 1970's it was found that as airspeed increased large droplets were broken into smaller droplets, thus producing more fines. But as airspeed decreased, the large droplets were less likely to break up and to produce fines.

Thus a new way of delivering pesticide and herbicide was needed to avoid the problem of excess fines or fine droplets that arose from the increased speed of the aircraft.

This inventor, who has a long history as a "crop duster", as that term is affectionately used, was aware that the pesticide being applied was being introduced into an airstream that settles onto the crops or ground. The fluid entered the airstream in the atomizer and was ejected out the orifice of the atomizer for delivery. He was also aware that the planes fly at a specific speed. Yet he wanted to avoid the formation of fine droplets. The theory that evolved was to maintain the desired airspeed, but keep the input speed of the fluid pesticide slow to avoid the formation of fines. The belief was that if the atomizer chamber input speed matched the speed of the plane, but the injection of the fluid into the airstream (impact time) was at a speed where fines tended not to form, and the ejection of the spray was also at the speed of the plane, a quality spray episode would result with minimal percent of fine droplets formation. Thus arose the concept of using a reverse venture atomizer, hereinafter RVA.

DISCUSSION OF THE EMBODIMENTS

In FIG. 1, there is seen a typical prior art atomizer unit commonly found mounted under the wings of spray aircrafts today. Since such apparatuses are well known and well understand little effort greats to be expanded to discuss this standard atomizer chamber.

FIG. 2, it is seen that the reverse venturi of this invention has two sections, a left section and a right section. Each section is divided into two segments. Each segment is seen to have two lateral opposed radii, lengthwise. The apparatus 20 has a first end 21 of a finite diameter such as two inches, with an exterior configuration lengthwise that changes from a first diameter 22 to a second diameter. This point 26 lies on a first radius, or arc segment 40, which is the radius of a circle that commences at the diameter 21's edge and continues rightwardly to point 35. The first arc segment 26 extends to point 35 which is also the commencement of the second arc segment 27 which second arc segment 27, is equal to the radius of a circle that is 16 and 3/16 inches, but said second segment 41 is oppositely radiused. The second segment extends from point 35 to point 36.

The outside configuration along the length continues in a flat smooth air section that extends from point 36 to an equal distance past the centerline 25 to point 37. The diameter 28 is a line that lays at any point between points 36 and 37 and their counterparts $\mathbf{36}^1$ and $\mathbf{37}^1$ on the opposite side of this cross-sectional view. The portion of the outside-designated radius 28 is a mirror image of radius 27, while arc segment 29 is a mirror image of arc segment 26. Therefore further discussion is not necessary. In summary, the outer segments of each section have an upper wall that is concave and a lower wall that is convex. While the inner segments of each section have the reverse, an upper segment that is convex and a lower segment that is concave.

A conventional spray injector 31 is disposed within the calm zone at any location between points 36,$\mathbf{36}^1$ and 37,$\mathbf{37}^1$ lengthwise, at any location along the length thereof, through an O-ring mount 52 and flange opening 34 to effectuate a seal. The atomizer nozzle has an inlet zone 32 and an outlet zone 33. The nature of the spray tip utilized on the nozzle forms no part of this invention.

Typical dimensions for the double venturi of this invention are two inches for the diameter of each end opening, with a four-inch diameter at the widest point in the calm zone with an overall length of about twenty inches. The length or elevation of the injector would be about the center of the chamber.

The discussion now turns to FIG. 3, the second embodiment. Whereas both halves of the RVA were mirror images in the first embodiment, designated sections 20A and 20B, while one of the sections is a smaller section elevationally, in the case of embodiments 2 and 3. In Embodiments 2 and 3 the two units are in fact similar in configuration but for the orientation of the left 50A, 80A and right side sections 50B and 80B. For this reason, in FIG. 2 the left section is designated 50A—the smaller, and 50B—the larger. But in the third embodiment, the left section, is 80B while the right section is 80A to maintain the consistency that A is always > B. Segment 56 of embodiment 2 is similar to segment 26 of embodiment 1, in that segment 56 is the radius of a curve of a circle similar to the arc segment that runs between diameter 20 and point 35. See also FIG. 3.

In FIG. 3, which has a left diameter of two inches for its inlet section, the first arcuate segment 70 of the 50A section runs from edge 51 to point 55, and is a duplicate of the first segment of the first embodiment. The second arc segment 71 is a mirror image curve that runs from point 55 to point 57 and is a duplicate of second arc segment 27 as per FIG. 2. This left segment has a diameter 55 of four inches.

The injector 61 of the second embodiment is an injector that is a duplicate of injector 31, and has an inlet port 62 and an outlet port 63. It is retained in place by an O-ring 52 or flange holder 64. The injector is inserted at any location along the calm zone that runs between point 57 and diameter 55 of the left section 50A, which diameter is the terminus of the left portion of this embodiment. This calm zone designated 60 is a duplicate of the calm zone designated 30 in the first embodiment.

Prior to the discussion of the right hand portion of the second embodiment, it is important to discuss the balance of the configuration of the apparatus. The second, third, and fourth figures are all side elevational views. In all of these, the sidewall of the three embodiments is always a continuous planar member. In FIGS. 3 and 4, the configuration of the side walls differ from left portion to right, but the sidewall is still a flat planer member. But the top and bottom view walls are not planar, but in fact are interrupted. Thus to better explain FIG. 3, reference is made to other related figures which show the distinction in the elevation of the two portions. Line 69 of FIG. 3 represents the elevational difference between the left portion and the right portion. When the entry port 51 is about two inches high, this elevation 69, which is called a mid-port, should be about one inch. This is merely an opening and is not a wall. A counterpart mid-port opening $\mathbf{69}^1$ is shown at the bottom of the third figure. The excess dimension of the calm area of the left portion that extends into the "bell" of the left portion at points 61 and $\mathbf{61}^1$ is but [one] inch in this example and may be larger/smaller in other examples. The zone 69 represents an entry port for additional air into the second portion of the embodiment. A counterpart zone $\mathbf{69}^1$ is also one inch tall. Both input zones extend full width across the apparatus. It is also within the scope of the invention to have no inset overlap such that dimension 67 equals zero.

As was noted supra, it is the desire of the inventor to maintain the speed of the air at entry and egress as the same.

Therefore addition of the elevation of two inches at entry port 51, namely dimension 52, with the elevation of 69 and 69[1] at one inch each, determines that the exit port 54 should have an elevation dimension 50 of four inches [2+1+1=4]. The overlap zone 67 between left portion 50A and right portion 50B is 53 of about one inch. This overlap serves to smoothen the air slightly, but is not really necessary. Overlap 93 is similar in the third embodiment.

The discussion now moves to the right portion of the second embodiment 50B. The segment that runs from the point of commencement at point 68 back toward the exit port extends to point 65 and is designated 58. This is the second calm zone and is equal in extension to the calm zone 60. Whereas the first embodiment had one calm zone 30 that was four inches in lateral extension, the second and third embodiment have two, two-inch laterally extending calm zones. See FIGS. 2 and 3.

An arc segment 59 extends from point 65 to point 66 and is also of the same radius as the second arc segment of the left side, IE, the radius of a circle that is 16 and 3/16 inches in circumference, and designated 57. The counterpart to first arc segment 56 of the left side is arc segment 65, which extends from point 59 to the exit port 54. The exit port 54 has a diameter of four inches as shown by arrow 53. See FIGS. 2,3, and 4 re R16 3/16.

Figure 2:
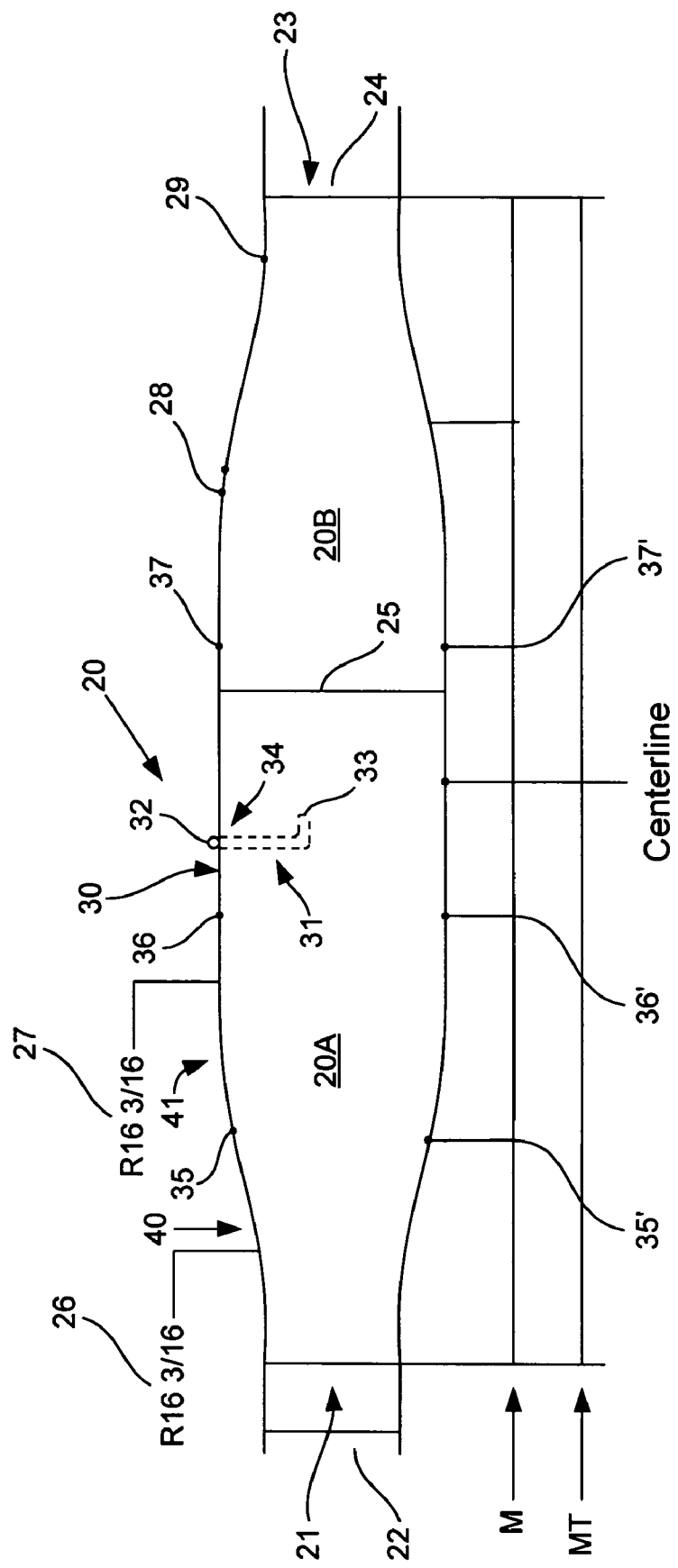
FIG. 2 is side sectional elevational view of the first embodiment of this invention.
Figure 3:
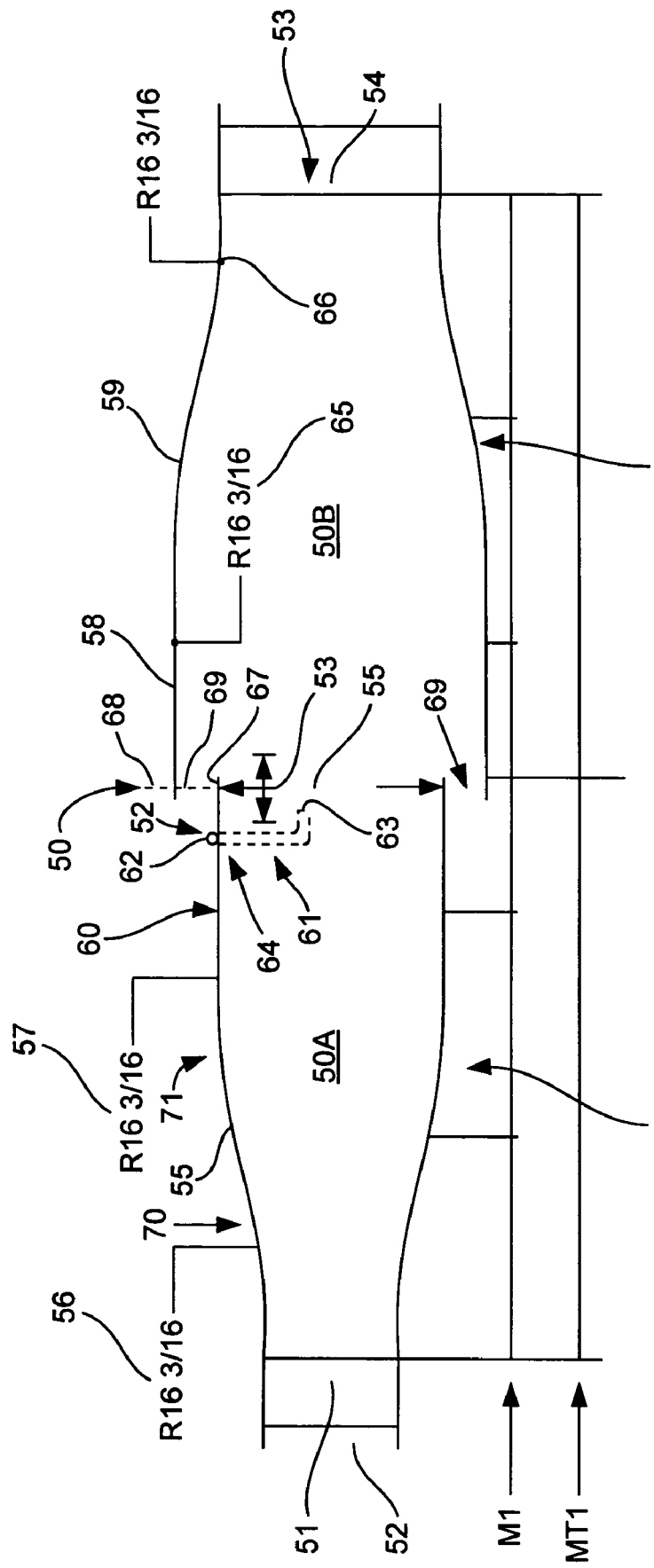
FIG. 3 is a side sectional elevational view of the second embodiment of this invention
Figure 4:
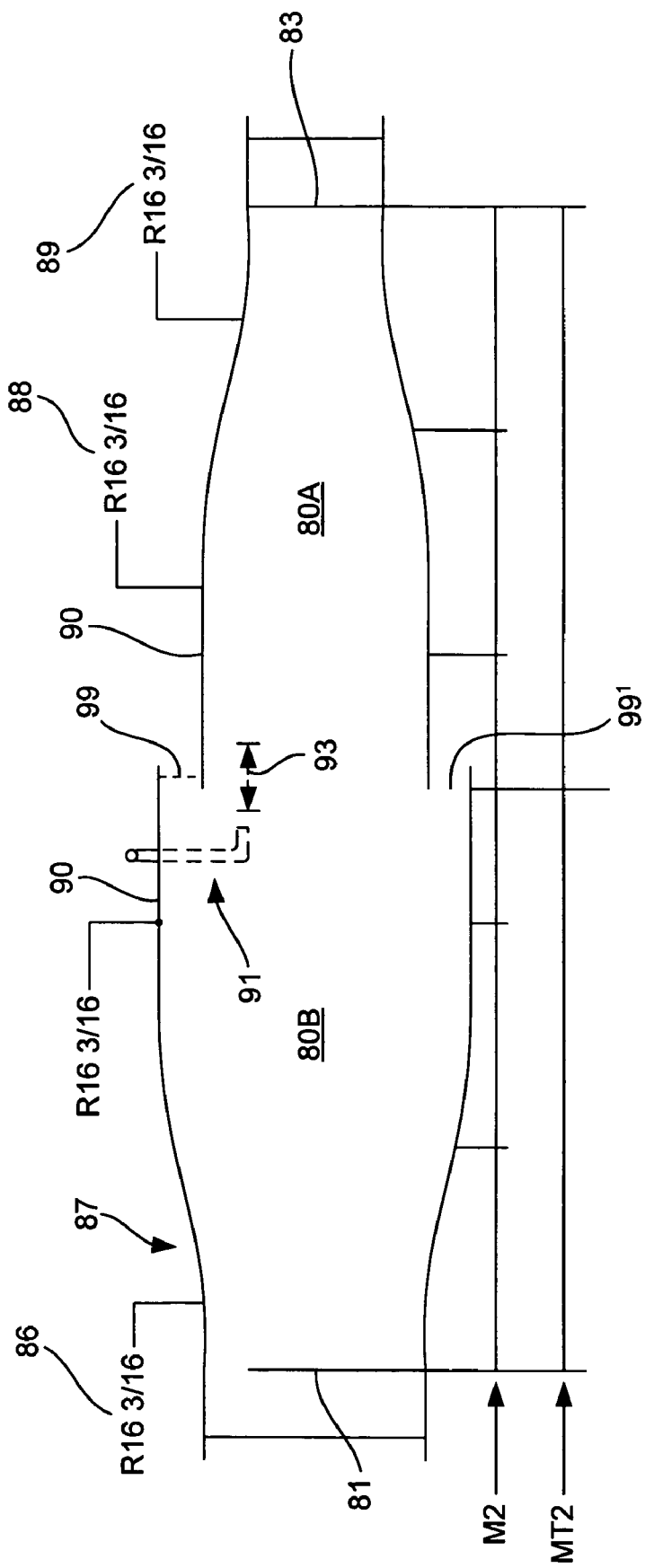
FIG. 4 is a side elevational view of the third embodiment of this invention.

The discussion now turns to FIG. 4. The embodiment shown here is the exact physical structure as shown and discussed with reference to FIG. 3. The only distinction is the location and direction of the placement of the nozzle injector. The movement of air in these two figures, as well as in FIG. 2, is always presumed to be "in" from the left and "out" from the right. The placement of the nozzle need not be in the left hand segment of the RVA, be it physically bigger or smaller in diameter. The nozzle for the first embodiment can be located anywhere in the total quiet zone of the first embodiment; or located in the quiet zone of the segment 50A or in the quiet zone of 50B for the second embodiment; and in the third embodiment, the placement may be in the quiet zone area of either 80A or 80B. For the second and third embodiments, there is a caveat that placement can only be in the left quiet zone—50A or 80B—so long as the nozzle employed at that location does not permit the fluid pesticide spray to escape out the mid-ports 99 and 99[1]. It is desired that substantially all of the pesticide be delivered from the exit port. This is a function of nozzle choice and location of placement. Note that in FIG. 4 no mount means that retains the nozzle injector is shown.

FIG. 12 depicts the same chamber as just previously discussed. The sole difference is in the orientation of the nozzle injector. Here the injector is designated 91H because of the sideward or horizontal disposition. While lacking in FIG. 4, the inlet port 92 is shown here. This inlet port is the interface between the hose line form the storage tank on the aircraft and the nozzle injector. While a simple O-ring retains the nozzle injector, more than a simple friction fit is obtained from using a detailed mount means to both retain and act as the interface. It is readily seen that the same requirements for the spraying the non-impact of the sidewalls of the chamber apply to horizontally disposed nozzles, and it is further seen that horizontally disposed nozzles can be utilized in any of the three embodiments.

The reader's attention is drawn to the dimensions set out as M & MT in FIG. 2; M1 in FIG. 3; and M2 and MT2 in FIG. 4. M, M1 and M2 are all incremental measurements of the twenty inch long RVA at specific points that correspond to the elongation of a particular segment; namely, arc segment 1, arc segment 2, and the calm (quiet) zones. These are four-inch lengths but for the splitting of the quiet zone of FIGS. 3 and 4 into two, two inch sections for a total of four inches. MT=MT1=MT2=20 inches for all three embodiments shown in FIGS. 2,3, and 4.

The term calm zone or quiet zone refers to the volume of space within the RVA in which the incoming air is neither accelerated nor decelerated. The speed stays the same when moving through that portion of the RVA.

On the top of configuration, it is seen that all three of the units set forth have flat sidewalls on each side uniformly spaced apart. The top wall and the bottom wall are each a pair of adjacent radii of a circle in FIG. 1, the designators 26 and 27, 28 and 29 refer to the radii of the two circle segments forming the top and bottom walls of the embodiment. Segments 26 and 29 are concave while 27 and 28 are convex, all being 16 and 3/8-inch circle radii. In the next two embodiments the segments are 56,57,58, and 59 for embodiment 2, and 86,87,88 and 89 for embodiment 3. All of which are the same respective radius as their twenty series counterparts. It is to be further understood that the radii are not limiting. Lager or smaller radii to elongate or shorten the apparatus may be used just so long as the ultimate goal of the slowing down the speed at the proper time and then raising it back up again is achieved. And, the amount of speed change will of course depend upon the airspeed of the plane during the delivery of product. The aim is to achieve optimal velocity atomization; as such achievement maximizes profits for the sprayer.

One further point on chamber design, for aesthetics and to smooth out air impacts, it is within the scope of this invention to have rounded corners on the units shown in the end views corresponding to the three embodiments. Chamfering of the outside corners can be done by grinding or machining but chamfering of the inside corners can be addressed by the use of a bead of silicon along the vertical-horizontal interfaces.

Figure 5:
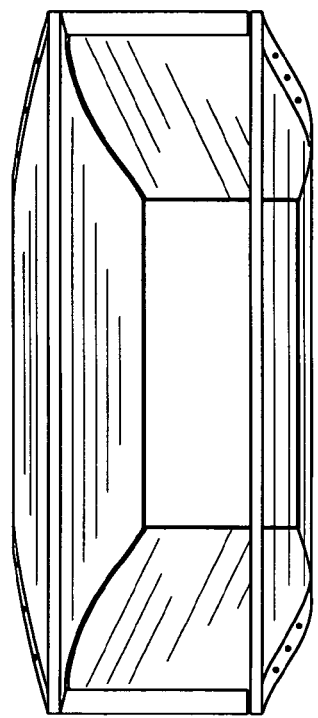
FIG. 5 is a bottom perspective view of the first embodiment.
Figure 6:
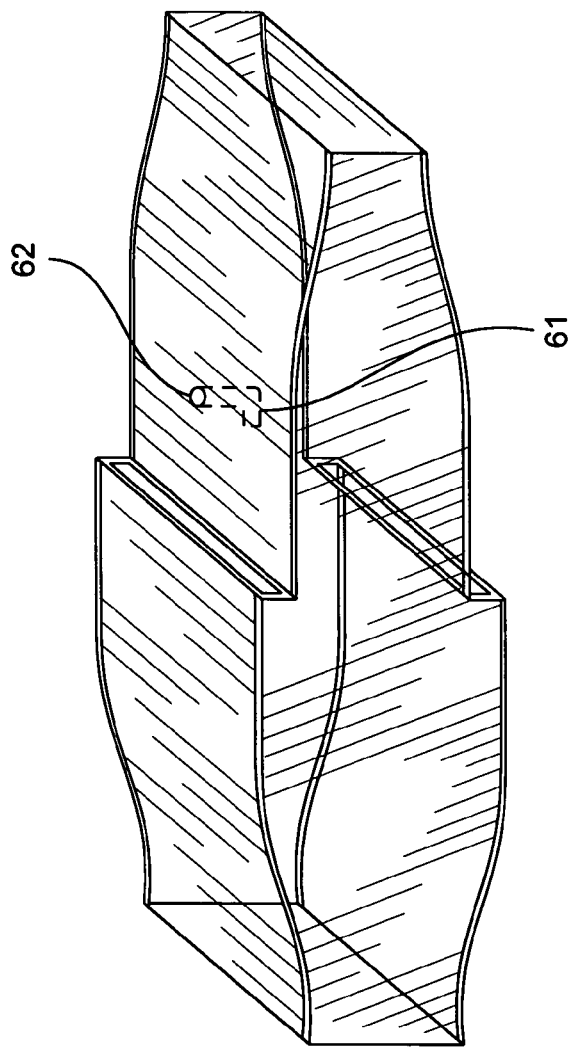
FIG. 6 is a side perspective view of the second embodiment.
Figure 8:
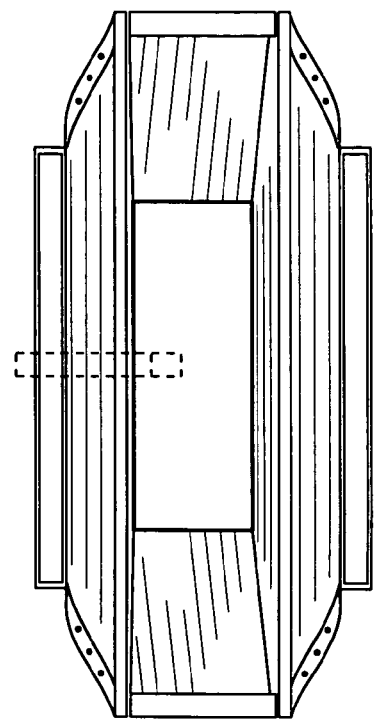
FIG. 8 is a left end perspective view of the second embodiment.
Figure 9:
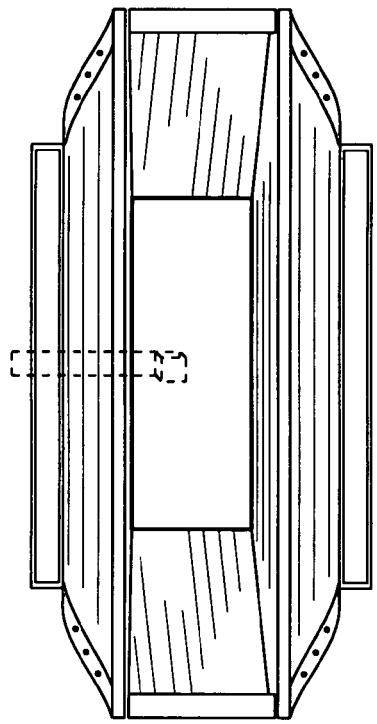
FIG. 9 is a left end perspective view of the third embodiment.
Figure 10:
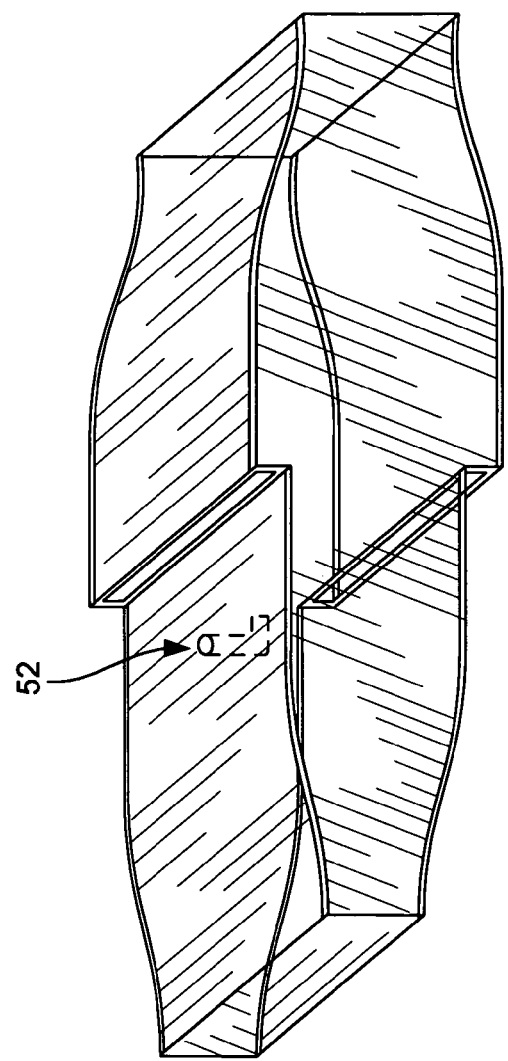
FIG. 10 is a side perspective view of the second embodiment.

It is to be seen that the cross section or end as seen in FIGS. 5, 8, and 9 having flat side and top/bottom walls need not be limiting. A curved side wall and even a fully circular apparatus having the suitable pressure drops designed into them can be employed, as can cross-sections of other configurations as well, while still achieving the double or reverse venturi effect.

The discussion now moves to the airspeed of the air as it travels through the RVA. For the sake of discussion, we will assume that the aircraft is flying at 100 mph. Therefore the incoming air in all three apparatuses at the entry port is 100 mph. In the first embodiment at the point 26 where the unit begins to widen out in cross section, the speed of the airstream starts to slow down. At point 27, the commencement of the calm zone, which is the widest cross section, the air has reached it slowest speed, which we will stipulate to be 50 mph. The injection of the fluid to be delivered in the first embodiment takes place in this zone, and the mixture is then accelerated as the RVA constricts. The air exits at the same speed it started, substantially at 100 mph.

In the second embodiment, FIG. 3, the air enters at the same presumed 100 mph and is slowed down in the left quiet zone of segment 50A to about 50 mph. When the air exits the left quiet zone and enters the right quite zone of 50B, one would believe that the air would again slow down further due to the greater diameter of the RVA chamber at the quiet zone 58. But due to the presence of the mid-ports rushing in high speed air at close to the speed of the plane, the extra elevation of the 50B section is offset, and so the flow of air maintains substantially the same speed as it enters 50B though perhaps a bit faster at say not to exceed 60 mph. The air is then concentrated and accelerates as it moves to the exit port 53, moving fast toward the exit speed of 100 mph.

In the third embodiment, FIG. 4, the air enters at location 81 at 100 mph, and then slows down to about 50 at the location of the quiet zone 90, where nozzle 91 is situated. Since each exit port 99,99$^1$ is set at one inch in elevation, such that air escapes from the left section 80B subsequent to the nozzle injection the air speed is maintained at the entry into chamber section 80A. The mixture of fluid and air then accelerates as it moves toward the exit port 83.

In all three embodiments, the input and exit speeds are substantially the same. It is also to be seen that in the second and third embodiments that the nozzle could be placed in the quiet zone of the opposed chamber. Thus in embodiment 2 the placement could be in the quiet zone of section 50B, and in embodiment 3 in the quiet zone of section 80A and still yield the same results. As noted elsewhere herein, the desire is to reduce the fines by having the fluid air impact be within the 40 to 80 mph range. The greater the ratio of aircraft speed to impact speed desired, the smaller will be the radii chosen of the chamber "top and bottom" walls. Thus a smaller radius will be used with a plane that flies 150 mph for a set impact speed than will be employed with a plane that flies at 100 mph.

While the two sections of the invention as described heretofore each have a top wall concave and a convex segment, that are substantially the same radius, and mirror image bottom wall segments, such need not be the case. It is believed that the inner segment convex upper radius, concave lower radius, can be greater or smaller as may be necessary to achieve the desired result. Factors that may slightly affect the radius are boundary layer effect, friction as affecting the moving air and pesticide, and surface tension. That is the atomization speed is optimized to reduce the most fines and the aircraft speed is allowed to continue at a safe speed to yield a safe and profitable delivery. The choice of actual radii of the chamber as measured in degrees is dependent upon the air speed of the specific aircraft being utilized.

The attachment of the fluid chemical hose to the nozzle injector is a conventional compression fitting readily available in the marketplace. The connection between the storage tank and the injector can be a flexible hose as noted elsewhere herein, or it can be a rigid tube as suits the situation.

In brief, in order to reduce the amount of fines, it has been found that atomization from the nozzle injector should transpire at a low speed. But the aircraft used doesn't fly well if at all at these slower speeds. So the point of this invention is to match the delivery speed of the pesticide to the speed of the aircraft, without reducing the airspeed of the plane or helicopter making the delivery while reducing the number of fines, by reducing speed of the fluid at the time of atomization [air impact] prior to delivery to reduce fines during delivery.

I has been found that if the impact speed of the incoming air is slowed down to be within the range of 40 mph to 80 mph that there is significant fines reduction, when the aircraft is flown at its intended speed for delivery of the pesticide. The determination of absolute actual optimal speed at which impact should transpire, is dependent upon three things. They are choice of aircraft and its normal flying speed, pesticide chosen and nozzle configuration. It should be stated however that an absolute determination while within the skill of the art is not necessary, as impact anywhere within the 40 to 80 mph range will significantly reduce fines formation.

DATA

Figure 7:
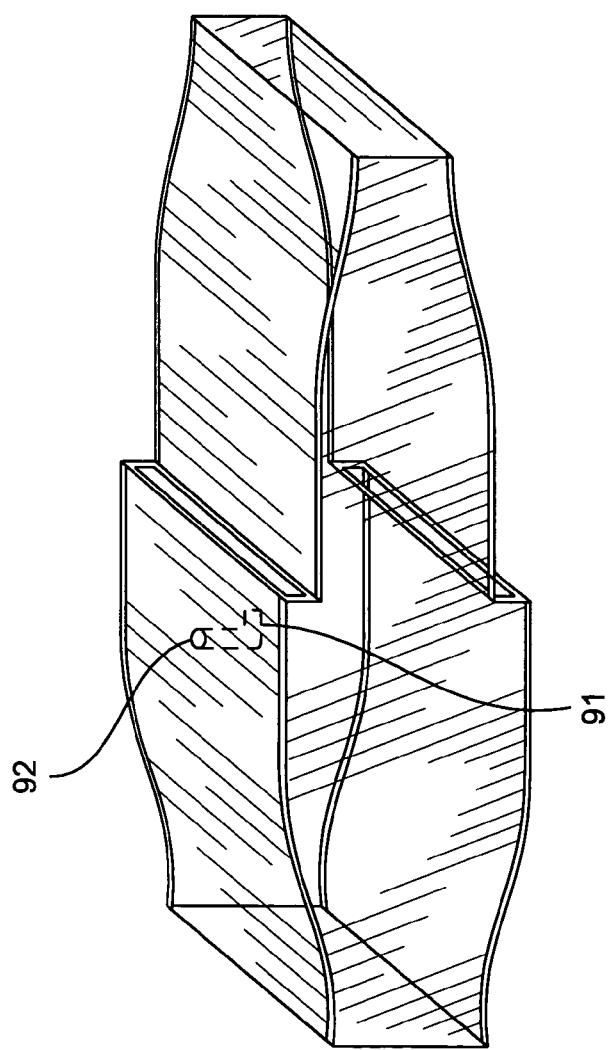
FIG. 7 is a side perspective view of the third embodiment.

While the mount means discussed above for the ejector nozzle has been recited as being an O-ring 52 with a friction fit, it is also within the scope of the invention to use a bulkhead fitting with a pair of nuts disposed upon a threaded cylindrical tube. The nuts are tightened against the interposed planar member to form a tight fitting mount. See FIG. 7 where an example of this shown, as well as FIG. 12.

The choice of nozzle ejector to use with this invention depends on the nature of the area to be sprayed and other considerations within the skill of the pilot. Knowledgeable spray personnel have the knowledge to pick the correct specific nozzle for any one situation.

As can be seen, the nozzle injector is disposed at a suitable location in the elevation of the unit. Since there are many types of nozzle spray patterns, such as fan, cone, solid stream, etc., there is no specific defined location elevationally speaking for the location. There are however design considerations that apply to any and all nozzle injectors. Wherever placed, the spray from the chosen nozzle injector should emit its fluid within any of the fluid impacting the top, bottom or sidewalls of the apparatus. It is within the skill of the art to make such determinations, which can be checked by static mounting of the apparatus in a wind tunnel and then visually checking the walls for impact subsequent to a fluid delivery test. With respect to the location of the nozzle injector front to back or laterally within the left half of the apparatus as shown in the drawings, again the simple parameter that now spray from the shape of injector utilized can hit the side walls or top/bottom walls, and none may go out of the vents for the pressure drop.

While the nozzle tubing has been shown to be mounted in the top wall of each embodiment, it is to be understood that the ejector could also be mounted on a laterally disposed boom and suspended into proper position within the air stream as may be desired. It is called such because the nozzle is both metering fluid and atomizing the fluid. While the cross section of the chamber herein has been discussed as being circular, square or rectangular it is also seen that a cross section unit will provide equally satisfactory results. See FIG. 12.

As noted earlier, the nozzle may be placed anywhere along the lateral extension of the calm zone of any of the embodiments set forth.

As used herein, the term "target area" can mean a field of crops, an area of a forest, an orchard of fruit or nut trees, tilled ground to be sprayed with a pre-emergent herbicide, mosquito control, or even a finite concrete area where a large outdoor gathering is to transpire.

While the structure herein has been depicted as being two sections, this is true only from a physical perspective of the structure. In point of fact, there are three zones; namely, the entry diffusion zone, the center-calming zone (speed reduction and impact of air and pesticide take place here), and an affusion zone for egress.

Since certain changes may be made in the described apparatus without departing from the scope of the invention herein involved, it is intended that all matter contained in the above description and shown in the accompanying drawings shall be interpreted as illustrative and not in a limiting sense.

I claim:

1. A reverse atomization chamber apparatus used for attachment to aircraft for the delivery of pesticides to a target area with the desire to reduce fines output during atomization, which apparatus comprises:

a reverse venturi chamber open at each end, said chamber being divided into two sections, a left section and a right section, each section having two outer and inner segments, each of which segments has a top wall and bottom wall, the outer segments having the same radius concave radius upper wall and convex radius lower wall; while the inner segments have a same radius convex radius upper wall and a concave radius lower wall;

a nozzle injector having a nozzle thereon disposed on one side in the inner segment, said injector being adapted for connection to a fluid source of pesticide, said nozzle being chosen such that exiting pesticide will not impact the walls of said chamber; and wherein the radii of the segments of the chamber are chosen such that the speed of atomization of the fluid pesticide by the incoming air is slowed down to reduce fines upon impact with the pesticide, and the speed of the pesticide air mixture on exiting the chamber is increased to substantially match the airspeed of the aircraft.

2. The reverse venturi atomization chamber apparatus of claim 1 wherein the nozzle injector is vertically disposed.

3. The reverse venturi atomization chamber apparatus of claim 1 wherein the nozzle injector is horizontally disposed.

4. The reverse venturi atomization chamber apparatus of claim 1 wherein the speed of impact of the incoming air with the pesticide is within the range of 40 mph to 80 mph.

5. The reverse venturi atomization chamber apparatus of claim 1 wherein the radii chosen for the chamber are chosen based on an airspeed of 100 mph for the plane and a desired impact speed of incoming air with the pesticide of about 50 mph.

6. The reverse venturi atomization chamber apparatus of claim 1 used for attachment to aircraft for the delivery of pesticides to a target area with the desire to reduce fines output during atomization wherein for both the left and right sections of the chamber, the outer segments have the same radius concave radius upper wall convex radius lower wall, while the inner segments have a same radius convex radius upper wall 1 and a concave radius lower wall, and the spacing between the outer segment upper and lower walls, and at spacing between the inner segment upper and lower walls of both sections of the apparatus are the same.

7. The reverse venturi atomization chamber apparatus of claim 1 wherein used for attachment to aircraft for the delivery of pesticides to a target area with the desire to reduce fines output during atomization wherein for both the left and right sections of the chamber, the outer segments have the same radius concave radius upper wall convex radius lower wall, while the inner segments have a same radius convex radius upper wall and a concave radius lower wall, and the spacing between the upper and lower walls, and at a finite lateral point, between the outer segment of one section is greater than the spacing between the upper and lower walls between the outer segment at the same finite point on the other section.

8. A reverse atomization chamber apparatus used for attachment to aircraft for the delivery of pesticides to a target area with the desire to reduce fines output during atomization, which apparatus comprises:

a venturi chamber open at each end, said chamber being divided into two sections, a left section and a right section, each section having two outer and inner segments, each of which segments has a top wall and bottom wall, the outer segments having the same radius concave radius upper wall and convex radius lower wall; while the inner segments have a same radius convex radius upper wall and a concave radius lower wall; and one of said section having an upper midport and a lower midport, said midports being in the section having a greater spacing between upper and lower walls between the outer segment at the same lateral finite point as on the other section;

a nozzle injector having a nozzle thereon disposed on one side in the inner segment, said injector being adapted for connection to a fluid source of pesticide, said nozzle being chosen such that exiting pesticide will not impact the walls of said chamber; and wherein the radii of the segments of the chamber are chosen such that the speed of atomization of the fluid pesticide by the incoming air is slowed down to reduce fines upon impact with the pesticide, and the speed of the pesticide air mixture on exiting the chamber is increased to substantially match the airspeed of the aircraft.

9. The reverse venturi atomization chamber apparatus of claim 8 wherein the injector in the section having the midports.

10. The reverse venturi atomization chamber apparatus of claim 8 wherein the injector in the section lacking the midports.

11. The reverse venturi atomization chamber apparatus of claim 8 wherein the nozzle injector is vertically disposed.

12. The reverse venturi atomization chamber apparatus of claim 8 wherein the nozzle injector is horizontally disposed.

13. The reverse venturi atomization chamber apparatus of claim 8 wherein the speed of impact of the incoming air with the pesticide is within the range of 40 mph to 80 mph.

14. The reverse venturi atomization chamber apparatus of claim 8 wherein the radii chosen for the chamber are chosen based on an airspeed of 100 mph for the plane and a desired impact speed of incoming air with the pesticide of about 50 mph.

15. The reverse venturi atomization chamber apparatus of claim 8 wherein the radii chosen for the chamber are chosen based on an airspeed of 180 mph for the plane and a desired impact speed of incoming air with the pesticide of about 90 mph.

16. The reverse venturi atomization chamber apparatus of claim 1 wherein the radii chosen for the chamber are chosen based on an airspeed of 180 mph for the plane and a desired impact speed of incoming air with the pesticide of about 90 mph.

17. A reverse atomization chamber apparatus used for attachment to aircraft for the delivery of pesticides to a target area with the desire to reduce fines output during atomization, which apparatus comprises:

a venturi chamber open at each end, said chamber being divided into two sections, a left section and a right section, each section having two outer and inner segments, each of which segments has a top wall and bottom wall, the outer segments having the same radius concave radius upper wall and convex radius lower wall; while the inner segments have a same radius convex radius upper wall and a concave radius lower wall; and one of said section having an upper midport and a lower midport, said midports being in the section having a greater spacing between upper and lower walls between the outer segment at the same lateral finite point as on the other section;

a nozzle injector having a fan shaped nozzle thereon disposed on one side in the inner segment of the section having the upper and lower midports, said injector being adapted for connection to a fluid source of pesticide, said nozzle being chosen such that exiting pesticide will not impact the walls of said chamber; and wherein the radii of the segments of the chamber are chosen such that the speed of atomization of the fluid pesticide by the incoming air is slowed down to reduce fines upon impact with the pesticide, and the speed of the pesticide air mixture on exiting the chamber is increased to substantially match the airspeed of the aircraft.

18. The reverse venturi atomization chamber apparatus of claim 17 wherein the radii chosen for the chamber are chosen based on an airspeed of 180 mph for the plane and a desired impact speed of incoming air with the pesticide of about 90 mph.

19. The reverse venturi atomization chamber apparatus of claim 17 wherein the fluid is injection at a 0-degree angle to the airflow.

20. A reverse atomization chamber apparatus used for attachment to aircraft for the delivery of pesticides to a target area with the desire to reduce fines output during atomization, which apparatus comprises:

an open ended, flat side walled chamber, divided into left and right sections, each having outer and inner segments, each segment having a top and bottom wall, the outer segments having a same radius concave radius upper wall and a convex radius lower wall, while the inner segments have a same radius convex radius upper wall and a concave radius lower wall; and a nozzle injector connected to a fluid pesticide source, disposed in one of said inner segments.

21. A reverse atomization chamber apparatus of claim 20 wherein one of said sections is of a greater elevation than the other of said sections, the larger section including upper and lower midports.

* * * * *